(12) United States Patent
Berkner

(10) Patent No.: US 7,068,851 B1
(45) Date of Patent: Jun. 27, 2006

(54) MULTISCALE SHARPENING AND SMOOTHING WITH WAVELETS

(75) Inventor: Kathrin Berkner, Palo Alto, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/467,544

(22) Filed: Dec. 10, 1999

(51) Int. Cl.
G06K 9/44 (2006.01)

(52) U.S. Cl. .................. 382/261; 382/263; 382/264; 382/265

(58) Field of Classification Search ........ 382/260–266, 382/240, 240.19
See application file for complete search history.

(56) References Cited

U.S. PATENT DOCUMENTS

| | | | |
|---|---|---|---|
| 5,644,662 A * | 7/1997 | Vuylsteke | 382/302 |
| 5,717,789 A | 2/1998 | Anderson et al. | |
| 5,774,578 A * | 6/1998 | Shimizu | 382/170 |
| 5,805,721 A | 9/1998 | Vuylsteke et al. | |
| 5,867,606 A | 2/1999 | Tretter | |
| 5,883,973 A | 3/1999 | Pascovici et al. | |
| 6,263,120 B1 | 7/2001 | Matsuoka | |

FOREIGN PATENT DOCUMENTS

EP 1 164 781 A1 12/2001

OTHER PUBLICATIONS

Vetterli, Martin, and Kovacevic, Jelena. Wavelets and Subband Coding, Upper Saddle River: Prentice Hall, 1995, ISBN 0-13-097080-8.*
Boccignone, Giuseppe, and Picariello, Antonio."Multiscale Contrast Enhancement of Medical Images", Acoustics, Speech, and Signal Processing, 1997 IEEE International Conference, Apr. 21-24, 1997.*
Choi, Hyeokho, and Baraniuk, Richard. "Multiple Basis Wavelet Denoising Using Besov Projections", Image Processing, ICIP 99 Proceedings, Oct. 24-28, 1999.*
Abramovich, F., Silverman, B.W., "Wavelet Decomposition Approaches to Statistical Inverse Problems," Biometrika, vol. 85, pp. 115-129, 1998.

(Continued)

Primary Examiner—Kanjibhai Patel
Assistant Examiner—Sath V. Perungavoor
(74) Attorney, Agent, or Firm—Blakely, Sokoloff, Taylor & Zafman LLP

(57) ABSTRACT

A method and apparatus for processing image data are described. In one embodiment, a method of processing image data comprises decomposing the image data into multiple decomposition levels by applying a wavelet transform to the image data, and modifying coefficients in at least two of the decomposition levels by scaling coefficients in theses decomposition levels using different scale dependent parameters for each of the decomposition levels.

76 Claims, 11 Drawing Sheets

OTHER PUBLICATIONS

Bhakaran, V., et al., "Text and Image Sharpening of Scanned Images in the JPEG Domain," Proceedings of the 1997 International Conference on Image Processing (ICIP '97), pp. 326-329, 1997.

Donoho, D.L., "Nonlinear solution of linear inverse problems by wavelet-vaguelett decomposition," J. of Appl. and Comp. Harm. Anal, vol. 2, pp. 101-115, 1995.

Mallat, S., A Wavelet Tour of Signal Processing. Academic Press, 1998.

Neelamani, R., Choi; H., Baraniuk, R., "Wavelet-based Deconvolution for Ill-conditioned Systems," in Proceedings of ICASSP, vol. 6, pp. 3241-3244, 1998.

Polesel, A., et al., "Adaptive unsharp masking for contrast enhancement," in Proceedings of ICIP'97, pp. 267-270, 1997.

Zong, X., Laine, A.F., Geiser, E.A., Wilson, D.C., "De-Noising and contrast enhancement via wavelet shrinkage and nonlinear adaptive gain," Proceedings of the SPIE, vol. 2762, pp. 566-574, Orlando, FL, 1996.

Andrews, H.C., Hunt, B.R., Digital Image Restoration. Prentice-Hall, Inc. Englewood Cliffs, New Jersey, 1977.

Berkner, K., Wells Jr, R.O., "Smoothness estimates for soft-threshold denoising via translation invariant wavelet transforms," Tech. Rep. CML TR98-01, Rice University, 1998.

Coifman, R.R., Donoho, D.L., "Translation invariant denoising," in Wavelets and Statistics, Springer Lecture Notes (A. Antoniades, ed.), Springer-Verlag, 1995.

Donoho, D.L., "De-noising by soft-thresholding," IEEE Transactions on Information Theory, vol. 41, No. 3, pp. 613-627, 1995.

Jain, A.K., Fundamentals of digital image processing. Prentice Hall, Englewood Cliffs, NJ, 1989.

Kingsbury, N., "The dual-tree complex wavelet transform: a new efficient tool for image restoration and enhancement," in Proc. European Signal Processing Conf., pp. 319-322, 1998.

Lang, M., Guo, H., Odegard, J.E., Burrus, C.S., Wells Jr, R.O., "Noise reduction using an undecimated discrete wavelet transform," IEEE Signal Processing Letters, vol. 3, pp. 10-12, 1996.

Pratt, W., Digital Image Processing, John Wiley & Sons, NY, 1978.

Abramovich, F., Sapatinas, T., Silverman, B.W., "Wavelet Thresholding via a Bayesian Approach," J. Royal Statist. Soc. Ser. B, vol. 60, pp. 725-749, 1998.

Devore, R.A., Jawerth, B., Lucier, B.J., "Image compression through wavelet transform coding," IEEE Trans. Information Theory, vol. 38, No. 2, pp. 719-746, 1992.

Donoho, D.L., Johnstone, I.M., "Adaption to unknown smoothness via wavelet shrinkage," J. Amercian Statist. Assoc., pp. 1200-1224, 1995.

Donoho, D.L., Vetterli, M., DeBore, R.A., Daubechies, I., "Data compression and harmonic analysis," IEEE Transactions on Information Thoery, vol. 44, No. 6, pp. 2435-2476, 1998.

Levy Vehel, J., Guiheneuf, B., "2-microlocal analysis and applications in signal processing" in Proceedings of International Wavelet Conference, Tanger, Morocco, 1998.

Munoz, A., Blu T., Unser, M., "Non-Euclidean Pyramids," in Proceedings of SPIE Conference, San Diego, vol. 4119, pp. 710-720, 2000.

Burt, Peter J., et al., "The Laplacian Pyramid as a Compact Image Code," IEEE Transactions on Communications, vol. Com-31, No. 4, Apr. 1983, pp. 532-540.

Galatsanos, Nikolas P., et al., "Methods for Choosing the Regularization Parameter and Estimating the Noise Variance in Image Restoration and Their Relation," IEEE Transactions on Image Processing, vol. 1, No. 3, Jul. 1992, pp. 322-336.

Lu, Jian, et al., "Contrast Enhancement Via Multiscale Graident Transformation," Proceedings of the 1994 International Conference on Image Processing (ICIP) '97, pp. 482-486.

Carrato, Sergio, et al: "A Simple Edge-Sensitive Image Interpolation Filter", Proceedings of the International Conference on Image Processing (ICIP) Lausanne, Sep. 16-19. 1996, New York, IEEE, US, vol. 1, pp. 711-714, XP010202493.

Carey, W. Knox, et al: "Regularity-Preserving Image Interpretation", IEEE Transactions on Image Processing, vol. 8., No. 9, Sep. 1999, pp. 1293-1297, XP002246254.

Reeves, T.H., et al: "Multiscale-Based Image Enhancement", Electrical and Computer Engineering, 1997. Engineering Innovation: Voyage of Discovery. IEEE 1997 Canadian Conference on St. Johns, NFLD., Canada May 25-28, 1997, New York, NY. (pp. 500-503), XP010235053.

\* cited by examiner

MULTISCALE SHARPENING AND SMOOTHING WITH WAVELETS

FIELD OF THE INVENTION

The present invention relates to the field of data and image processing; more particularly, the present invention relates to performing sharpening and smoothing on multiple scales, or levels, of a decomposition of a signal or image.

BACKGROUND OF THE INVENTION

Sharpening and smoothing is fundamental to image enhancement and restoration. Image enhancement refers to accentuation of features of an image such as edges, boundaries, or contrast, and includes noise reduction, edge crisping and sharpening, filtering and many often well-known processes. Image restoration usually involves filtering an observed image to minimize, as best as possible, the effort of degradation. See A. K. Jain Fundamentals of Digital Image Processing, and W. Pratt, Digital Image Processing. Sharpening and smoothing are commonly used techniques in digital photography and scientific and medical imaging.

A popular sharpening method is referred to as unsharp masking which filters the image with a special highpass filter. A disadvantage of unsharp masking is that noise in the image is also sharpened and that the resulting output often looks "unnatural" since the choice of the appropriate degree of sharpening is difficult.

There exist many sharpening filters for image processing. These sharpening filters magnify the edges in an image, typically by highpass-filtering of the original image. A common method is unsharp masking as described in, for example, "Fundamentals of Digital Image Processing," by A. K. Jain, Prentice Hall, 1989.

In unsharp masking, given an image f(x), a sharpened image $f_{sharp}(x)$ is obtained by adding a magnified gradient image to a smoothed ("unsharped") version of the image, i.e.

$$f_{sharp}(x):=f_{smooth}(x)+\lambda f_{gradient}(x) \quad (1)$$

where $\lambda>1$ is the sharpness parameter. The sharpness increases with increasing $\lambda$. If the image f(x) can be written as a sum of a lowpass filtered image $f_{low}$ and a highpass filtered image $f_{high}$ then Eq.(1) can be expressed as $$f_{sharp}(x)=f_{low}(x)+(\lambda-1)f_{high}(x). \quad (2)$$

In this approach the lowpass and highpass filters are fixed. One problem with this approach is that a priori it is not known what filter size, filter coefficients, and what value for the parameter $\lambda$ is appropriate. If $\lambda$ is too large, the image looks unnatural. To overcome this problem, some approaches apply several filters and take that output which looks most "natural" (see e.g., "Real World Scanning and Halftones," Peachpit Press, Inc., Berkeley, 1993 by D. Blatner, S. Roth).

In order to overcome the problem of sharpening not only "real" edges, but also noise pixels, the approach in "Adaptive Unsharp Masking for Contrast Enhancement," in Proceedings of the 1997 International Conference on Image Processing (ICIP '97), pp. 267–270, 1997, by A. Polesel, G. Rampoui and V. J. Mathews, adds an adaptive directional component to an unsharp masking filter in the pixel domain that changes the sharpening parameter depending on strength and orientation of an edge. The unsharp masking filter is a two-dimensional Laplacian.

As mentioned above, the unsharp masking technique raises the problem of determining the degree of sharpening of an image that is best (i.e., finding the correct amount of sharpening). One solution to this problem is addressed in U.S. Pat. No. 5,867,606, entitled "Apparatus and Method for Determining the Appropriate Amount of Sharpening for an Image," issued Feb. 2, 1999, assigned to Hewlett-Packard Company, Palo Alto, Calif., for using the Laplacian in the unsharp masking technique. As a solution the magnitude of the sharpening parameter $\lambda$ is determined by matching the Fourier spectrum of the sharpened image with a spectrum of a low resolution version of the original image. This requires in addition to the unsharp masking filters, a Fourier transform on the original image which has a higher computational complexity than a discrete wavelet transform. Furthermore, only one lower resolution image is incorporated into the technique.

The problem of enhancing a scanned document, such as, sharpening of scanned images in the JPEG domain is discussed in "Text and Image Sharpening of Scanned Images in the JPEG Domain," Proceedings of the 1997 International Conference on Image Processing (ICIP '97), pp. 326–329, 1997 by V. Bhaskaran, K. Konstantinides and G. Beretta. One proposed solution consists of a scaling of the encoding quantization tables to enhance high frequencies. The amount of scaling depends on the energy contained in the corresponding DCT coefficients. Since DCT functions form only a basis in $L^2$ (R), but not in more sophisticated smoothness spaces as, e.g., Hoelder spaces $C^\alpha$(R), JPEG compression introduces blocky artifacts, a well-known problem in JPEG-compressed images. Those artifacts can be even magnified by scaling the DCT coefficients.

Wavelet coefficients have been modified for the purpose of contrast enhancement in images using criteria such as minimizing the mean-squared-error. However, these approaches do not consider the theoretical smoothness properties of an image in terms of local regularity and are computationally more complex.

In the prior art, detail versions of the image have been processed. Such an approach is described in U.S. Pat. No. 5,805,721, "Method and Apparatus for Contrast Enhancement," issued Sep. 8, 1998, assigned to Agfa-Gevaert, Belgium. In this approach, the image is decomposed into detail images at different resolutions and a lowpass image. This decomposition is not a subband decomposition, but a Laplacian pyramid where the reconstruction process consists of simply adding detail and lowpass images. The detail coefficients are multiplied with factors that depend on the magnitude of wavelet coefficients. This multiplication can be described by evaluating a monotonic function. This function has power-law behavior, but does not change over scales. In a renormalization step, the pixels in the detail images are first normalized by the possible maximum of the pixels in the detail images. There is no discussion on how to choose the parameter contained in the monotonic function.

Modifications of wavelet coefficients have also been made based on energy criteria. For example, contrast enhancement in images by modifying wavelet coefficients based on energy criteria is described in "De-Noising and Contrast Enhancement Via Wavelet Shrinkage and Nonlinear Adaptive Gain," Proceedings of the SPIE, Vol. 2762, pp. 566–574, Orlando, Fla., 1996 by X. Zong, A. F. Laine, E. A. Geiser and D. C. Wilson. One problem with this approach is that many computations are required because a comparison of local energy is performed for each individual wavelet coefficient. Furthermore, the modifications only apply to critically sampled wavelet transforms.

Embodiments of the present invention avoid or overcome one or more of the above mentioned problems.

SUMMARY OF THE INVENTION

A method and apparatus for processing image data are described. In one embodiment, a method of processing image data comprises decomposing the image data into multiple decomposition levels by applying a wavelet transform to the image data, and modifying coefficients in at least two of the decomposition levels by scaling coefficients in these decomposition levels using different scale dependent parameters for each of the decomposition levels.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
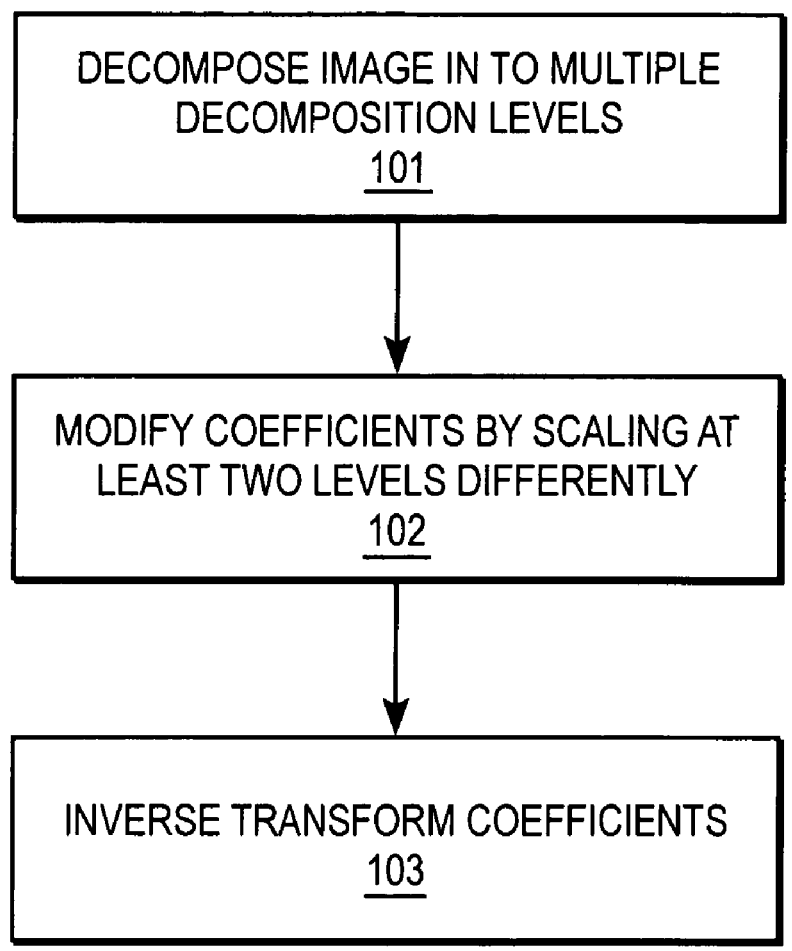
FIG. 1 illustrates one embodiment of a method for processing image data.

A multiscale sharpening and smoothing technique with wavelets is described. In the following description, numerous details are set forth, such as specific filters, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed description which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

Techniques for multiscale sharpening and smoothing of data with wavelets, such as image data, are described herein. The multiscale sharpening and smoothing techniques described herein, also referred to as multiscale unsharp masking, provides an alternative to the prior art methods described above and is simple to implement. This approach uses the smoothness properties of wavelet systems to provide the sharpening and smoothing.

Specifically, the techniques described herein sharpen and smooth images over various levels of resolutions using a new sharpening/smoothing parameter. In one embodiment, the multiscale sharpening and smoothing is implemented in a wavelet decomposition by multiplying wavelet coefficients with a scale-dependent parameter. FIG. 1 illustrates one embodiment of a method for processing image data. The method is performed by processing logic, which may comprise hardware, software or a combination of both. Referring to FIG. 1, the process begins by decomposing the image data into multiple decomposition levels by applying a wavelet transform to the image data (processing block 101). The transform that is applied to the image data may comprise, for example, a critically sampled discrete wavelet transform, an overcomplete discrete wavelet transform, a complex wavelet transform, a critically sampled or overcomplete wavelet packet transform. In one embodiment, the image data is transformed into multiple decomposition levels using a critically sampled transform for selected subbands an overcomplete transform in others.

Then, after performing the decomposition, the process modifies coefficients in multiple decomposition levels by scaling coefficients in those decomposition levels using different scale, or level, dependent parameters for each of the decomposition levels (processing block 102). For example, where scaling two levels, each coefficient in one of the decomposition levels is multiplied by a first scale dependent parameter and each coefficient in another of the decomposition levels is multiplied by a second scale dependent parameter.

In one embodiment, each of the different scale dependent parameters is determined according to the following formula:

$$\mu_j = 2^{j\alpha} \quad (3)$$

where the value of $\alpha$ (positive or negative) indicates whether sharpening or smoothing is applied to coefficients and j indicates the particular scale (level). In one embodiment, sharpening is applied to coefficients if $\alpha$ is less than zero and smoothing is applied to coefficients if $\alpha$ is greater than zero. Thus, if $\mu_j$ is greater than 1, then the result of the scaling operation is smoothing, while if $\mu_j$ is less than 1, then the result of the scaling operation is sharpening. The rescaling is applied only to wavelet (detail) coefficients, not scaling coefficients. In order to preserve the total energy of the image, a renormalization of the wavelet coefficients may be necessary.

In one embodiment, the scale dependent parameter is selected based on knowledge of the image data. That is, information extracted directly from the image can be incorporated in the choice of the sharpening or smoothing parameter. For example, knowledge that the input data indicates step edges may be used to select the sharpening or smoothing parameter. Knowledge of the source of the image, e.g., scanner, may also be the basis of the selection of the sharpening or smoothing parameter. For example, this knowledge could be information on the point spread function in a scanner or other image source. In still another embodiment, the scale dependent parameter may be selected based on a monotonic function. The scale dependent parameter may be selected based on an estimate of the decay of wavelet coefficients across scales.

Referring back to FIG. 1, after performing the multiscale sharpening and/or smoothing, processing logic performs an inverse transform on scaled (and unscaled) coefficients (processing block 103).

This technique may be combined with other wavelet-based image processing methods such as, for example, denoising. That is, multiscale sharpening and smoothing may be combined with other image processing steps in the wavelet domain. It has been shown in many applications that wavelet denoising is successful because edges are kept sharp whereas the noise is removed in smooth regions. This denoising can be simply done by thresholding wavelet coefficient. Suitable thresholding techniques include hard and soft thresholding. See, for example, Donoho, D. L. "De-noising by Soft-Thresholding, IEEE Trans. Inform. Theory, 41(3):613–627, 1995.

In one embodiment, simultaneously denoising and sharpening may be performed on wavelet coefficients by multiplying all coefficients above a predetermined threshold by a scaling parameter and setting all coefficients in the same decomposition level below a threshold to zero or to a value near zero. In one embodiment, all the values of coefficients are reduced by a predetermined amount that might be given by a monotonic function. The resulting coefficients are then multiplied with the scale dependent parameter.

In the presence of random White Gaussian Noise, one advantage of the combined denoising and sharpening/smoothing technique is that the denoising threshold can be computed directly from wavelet coefficients and the amount of input data, but does not depend on the actual signal. Whereas with traditional sharpening the problem of sharpening not only "real" edges, but also noise pixels, occurs wavelet sharpening and denoising can be done, for example, by choosing a threshold, multiplying all coefficients above that threshold by $\mu_j = 2^{j\alpha}$ and setting all coefficients below a threshold to zero. This leads to easy implementation of signal adaptive smoothing and sharpening as needed or required, e.g., in a digital copier.

A common model for noise in data is additive Gaussian White noise. A technique developed by Donoho and Johnstone for denoising with wavelets is a state of the art denoising technique. The denoising is performed by simply thresholding wavelet coefficients. The threshold depends only on the size of the data N, where N is the number of samples (for an image, the number of samples is the number of pixels) and the standard deviation of the noise $\sigma$, the threshold is:

$$\sigma\sqrt{2 \log N}$$

The latter parameter can be estimated from the standard deviation of the first level of wavelet coefficients. Asymptotically, all noise should be removed as N goes to infinity using that technique. However, in practical application, there may still be some noise present in the data due to the finiteness of the data or different threshold selection. It is also known that the human visual system corresponds positively to some noise present in, for example, images. After the rescaling (sharpening or smoothing) of wavelet coefficients described herein, the inverse transform transforms the remaining White noise into Colored noise (e.g., coloring remaining noise).

Similarly, the wavelet coefficients may have to be renormalized, particularly to maintain the proportions of modified wavelet coefficients and original scaling coefficients as described in more detail below. The renormalization may be performed by applying a scalar to the coefficients in all levels or a subset of all levels. In one embodiment, renormalization may be combined with the sharpening or smoothing by multiplying all coefficients at one or more of the decomposition levels by a scale dependent parameter chosen to achieve renormalization and sharpening/smoothing. In an alternative embodiment, renormalization may be performed by computing a range of wavelet coefficients (e.g., the minimum and maximum coefficient values) before resealing, and then perform the rescaling (sharpening or smoothing). Thereafter, the complete set of modified coefficients are scaled back to the original range (e.g., mapping the smoothed or sharpened coefficients back into the original range specified by the minimum and maximum coefficient values) before the rescaling.

Figure 2:
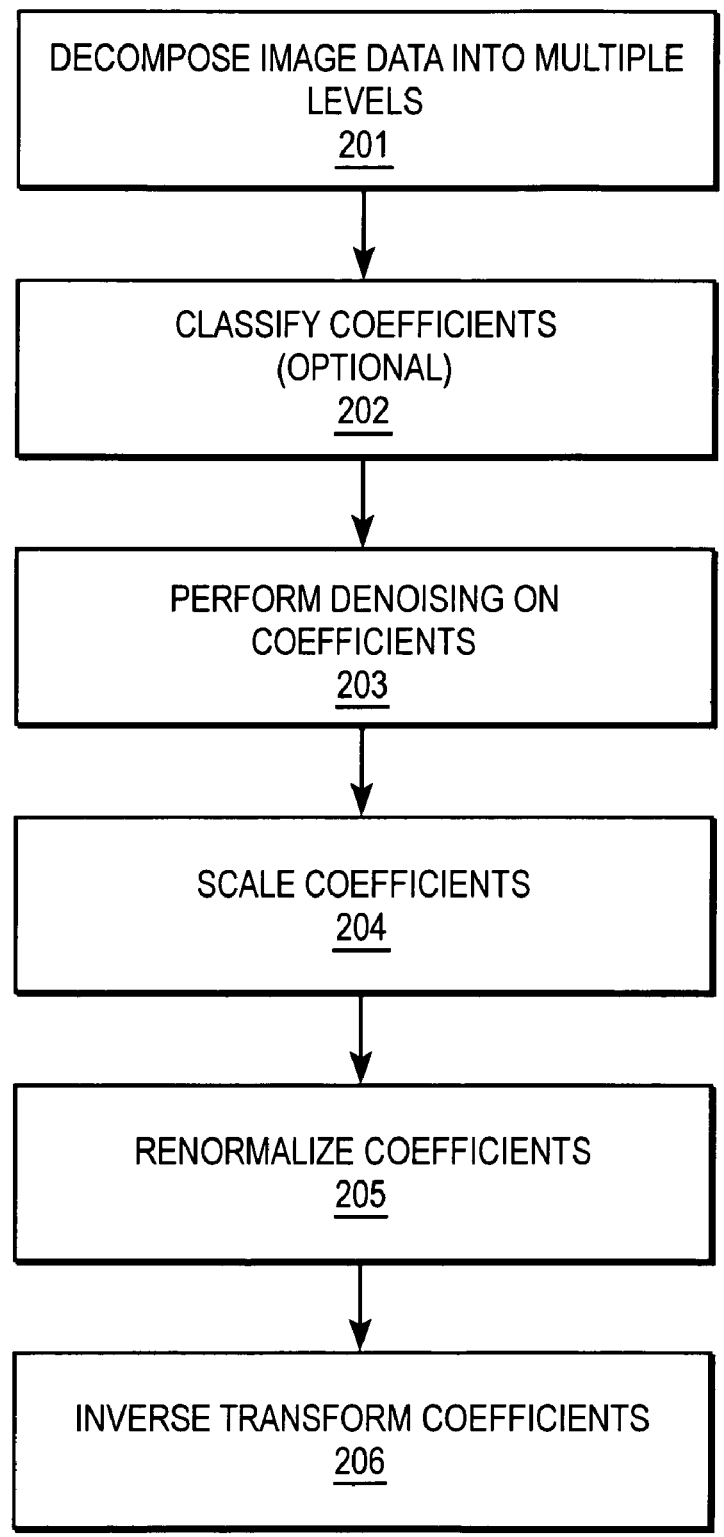
FIG. 2 illustrates another embodiment of the process for processing image data.

FIG. 2 illustrates another embodiment of the process for processing image data. The process is performed by processing logic that may comprise hardware, software, or a combination of both. Referring to FIG. 2, the process begins by processing logic decomposing the image data into multiple decomposition levels by applying a wavelet transform to the image data (processing block 201).

Once decomposition has been completed, then processing logic classifies the coefficients at different decomposition levels and bands (processing block 202). This classification is optional. In one embodiment, coefficients are classified into "text" and "background" depending on a predetermined criterion. The resulting classification may be used for adapting the smoothing or sharpening to compensate for the type of data being processed.

Then, processing logic performs denoising on coefficients in one or more of the decomposition levels (processing logic 203).

After performing the decomposition and classification, the processing logic modifies in multiple decomposition levels by scaling classified coefficients in those decomposition levels using different scale (level) dependent parameters for each of the decomposition levels (processing block 204). In one embodiment, the parameters may be band dependent parameters. For a 1D transform, there is one band (or subband) for each scale (level). For 2D or higher dimensional transforms, each band is a particular scale (level) and orientation. For example, a two 2D transform has a band for the first scale (level) and for the vertical detail (high-pass) and the horizontal smooth (low-pass).

After sharpening or smoothing has been performed, processing logic performs renormalization on the coefficients (processing block 205) on all levels or a subset of all levels. Once renormalization has been performed, processing logic performs an inverse transform on scaled (and unscaled) coefficients (processing block 206).

Note that techniques for sharpening and smoothing described herein are advantageous in that "real" edges are magnified over various scales more than noise pixels and smooth areas are smoothed over various scales. The techniques may also outperform the traditional unsharp masking with respect to the quality of the processed image.

Sharpening/Smoothing Theory

The theory behind the sharpening and smoothing techniques of the present invention, is described below. In the following, a description is given as to how these results can be used for deriving multiscale unsharp masking via discrete wavelet decompositions.

Let $\{H, H^*, G, G^*\}$ be a quadruple of biorthogonal wavelet filters (H=lowpass, G=highpass), where H and G are used in the forward transform and $H^*$ and $G^*$ in the inverse transform. In the Z-transform domain a 2-channel perfect reconstruction filter bank is required to satisfy the following conditions (see e.g., G. Straug, T. Nguyen, "Wavelets and Filter Banks," Wellesley-Cambridge Press, 1996).

$$H^*(z)H(z)+G^*(z)G(z)=2z^{-m} \quad (4)$$

$$H^*(z)H(-z)+G^*(z)G(-z)=0. \quad (5)$$

As a consequence the following equality, also known as perfect reconstruction property, is guaranteed for an arbitrary signal X:

$$z^{-m}X(z)=\frac{1}{2}[H^*(z)H(z)X(z)+H^*(z)H(-z)X(-z)]+\frac{1}{2}[G^*(z)G(z)X(z)+G^*(z)G(-z)X(-z)].$$

Introducing the following notations:

$F_0[X](z) := \frac{1}{2}[H^*(z)H(z)X(z)+H^*(z)H(-z)X(-z)]$ (lowpass output) and $F_1[X](z) := \frac{1}{2}[G^*(z)G(z)X(z)+G^*(z)G(-z)X(-z)]$ (highpass output) the perfect reconstruction property can be rewritten as $$z^{-m}X(z)=F_0[X](z)+F_1[X](z). \quad (6)$$

If the filters H and G are symmetric and centered around zero the delay is zero, i.e. m=0.

Since $F_0$ is a lowpass and $F_1$ is a highpass filter, there exists a wavelet formulation of the definition of a sharpened image $F_{dwt-s}(x)$ by $$x_{dwt-s}[z] := F_0[x](z)+\mu F_1[x](z). \quad (7)$$

where the wavelet sharpening parameter $\mu$ is equivalent to the parameter $\lambda$ in the traditional sharpening method in Eq(1).

When computing scaling and wavelet coefficients at larger decomposition levels, the input data X are the scaling coefficients $s^j$ at a specific scale j. The wavelet sharpening parameter $\mu$ can differ from scale to scale (i.e., level to level). The results from the theory of smoothness spaces, which is described in, for example, Y. Meyer, "Wavelets and Operators," Cambridge University Press, Cambridge, WC, 1992, lead in a natural way to a definition of multiscale sharpening by choosing a scale-dependent sharpening parameter.

$$\mu_j=2^{j\alpha}, \text{ with } \alpha<0 \quad (8)$$

The parameter $\alpha$ changes the overall smoothness of the signal in terms of Hoelder regularity.

The "sharpened" scaling coefficients $s^j_{dwt-s}$ at scale j are then defined as $$s^j_{dwt-s}=F_0[s^j]+\mu_j F_1[s^j]. \quad (9)$$

Figure 3:
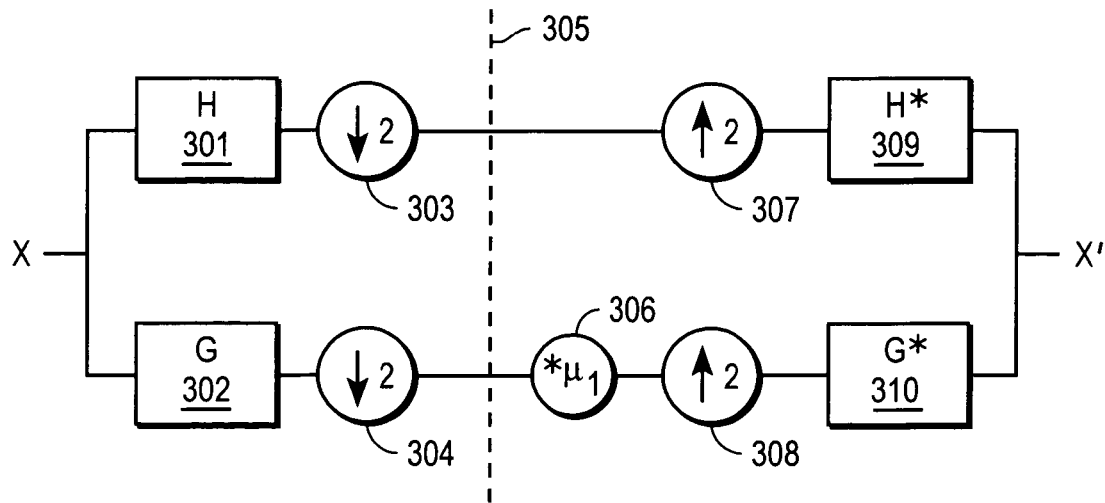
FIG. 3 illustrates a block diagram of filter bank implementation of the first level of multiscale unsharp masking with a discrete wavelet transform.

Analogous to the theoretical results on smoothness characterization, the parameter choice $\alpha<0$ sharpens the image. The range of $\alpha$ is bounded by constraints given through the chosen wavelet system. A block diagram of a first stage of a filter bank implementation of this method is shown in FIG. 3. Referring to FIG. 3, an input signal X is input into a low pass (H) wavelet filter 301 and a high pass (G) filter 302. The outputs of filters 301 and 302 are coupled to decimation units 303 and 304, respectively, which decimate the signals from filters 301 and 302 by two (critically subsampled). Line 305 represents the separation between the analysis portion and the synthesis portion of the system shown in FIG. 3. Although not shown, the low pass transferred signals may be input into filters 301 and 302 iteratively to create additional decompositional levels with parameter $m\mu_j$. This process may be repeated to create any number of decomposition levels (e.g., 2, 3, 4, 5, etc.).

Between the analysis portion and the synthesis portion, a coder and decoder may be included (not shown to avoid obscuring the invention). The coder and decoder may contain all the processing logic and/or routines performed in the transformed domain (e.g., prediction, quantization, coding, etc.).

The critically subsampled signals that are output from decimation unit 304 are input to scaling unit 306 (after any coding and decoding). Scaling unit 306 applies different scale dependent parameters $\mu$ to transformed signals of multiple decomposition levels.

The subsampled transformed signals that are output from decimation unit 303 and the scaled output from scaling unit 306 are input to upsampling units 307 and 308, respectively, which upsamples the transformed signals by 2 (e.g., a zero is inserted after every term) and then passes the signals to low pass inverse wavelet transform filter 309 and high pass inverse wavelet transform filter 310, respectively. The outputs of filters 309 and 310 are combined by addition unit 311 to produce an output signal $X^1$. Addition unit 311 adds its two inputs. In alternative embodiments, addition unit 311 may write to alternating locations in memory (e.g., frame buffer) or store the information using addresses selected to result in the combined output.

In order to preserve the total energy of the image and to maintain the proportions of modified wavelet and original scaling coefficients a renormalization of wavelet coefficients may be used. In one embodiment, this is done by dividing the modified coefficients by $$\sqrt{n_{\alpha\gamma}}$$

where $$n_{\alpha,\gamma} = \left[\frac{2^{(L+1)2(\gamma+\alpha)} - 2^{2(\gamma+\alpha)}}{2^{2(\gamma+\alpha)} - 1}\right] / \frac{2^{(L+1)2\gamma} - 2^{2\gamma}}{2^{2\gamma} - 1} \text{ for } -\alpha \neq \gamma. \quad (10)$$

$$n_{\alpha,\gamma} = L/\left[\frac{2^{(L+1)2\gamma} - 2^{2\gamma}}{2^{2\gamma} - 1}\right] \text{ for } -\alpha \neq \gamma. \quad (11)$$

$\lambda$ is the upper bound on the Hoelder regularity range of the wavelet system and $\alpha$ is the chosen sharpening parameter. For a Daubechies-8 wavelet system of order 4 (filter length=8, $\lambda$=1.596 with $\alpha$=−1.596 the normalization factor results in $$\sqrt{L/\left[\frac{2^{(L+1)-3.192} - 2^{3.192}}{2^{3.192} - 1}\right]}. \quad (12)$$

Hoelder regularity and vanishing moments for various Daubechies wavelet systems from the book by Ingrid Daubechies, "Ten Lectures on Wavelets," SIAM, Philadelphia, Pa., 1992 are shown in Table 1 below:

TABLE 1

| Daubechies wavelet system of order N | Hoelder regularity | Vanishing moments | $\gamma$ = min (Hoelder, vanishing moments) |
|---|---|---|---|
| 1 | — | 1 | — |
| 2 | ≧0.5 | 2 | ≧0.5 |
| 3 | ≧0.915 | 3 | ≧0.915 |
| 4 | ≧1.596 | 4 | ≧1.596 |
| 5 | ≧1.888 | 5 | ≧1.888 |
| 6 | ≧2.158 | 6 | ≧2.158 |

The parameter $\lambda$ is the minimum of vanishing moments and Hoelder regularity. Alternative renormalization techniques may be used.

The lack of shift-invariance of the critically sampled DWT is a disadvantage for image processing steps such as denoising and also multiscale smoothing and sharpening because one particular edge could be smoothed or sharpened differently depending on the alignment of the edge in the wavelet tree. To overcome this disadvantage, an overcomplete (redundant) DWT, denoted by RDWT, is chosen and outperforms the critically sampled DWT. If an RDWT is chosen for sharpening an image, the same approach as described above may be used to define a multiscale unsharp masking. The main difference is that down- and up-sampling steps in the filter bank are neglected.

The perfect reconstruction property of the RDWT at scale 1 is given by $$x(z) = \tfrac{1}{2}(H^* H[x](z) + G^* G[x](z)). \quad (13)$$

Figure 4:
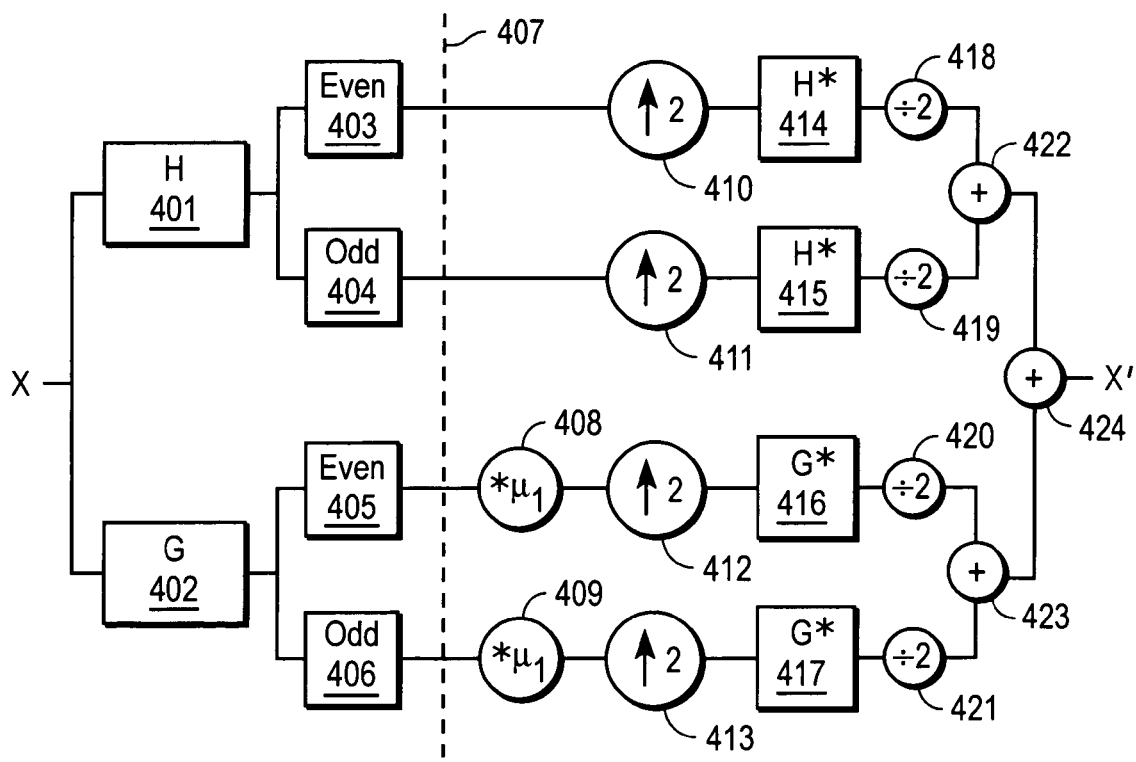
FIG. 4 illustrates another block diagram of a filtering implementation of the first level of multiscale unsharp masking with an overcomplete discrete wavelet transform.

A schematic overview is shown in FIG. 4. Referring to FIG. 4, an input signal X is input to low pass wavelet transform filter 401 and high pass wavelet transform filter 402. The output of filter 401 is separated into even coefficients 403 and odd coefficients 404, and the output of filter 402 is separated into even coefficients 405 and odd coefficients 406. Note that no decimation is performed. As with line 305 of FIG. 3, line 407 again represents the separation between the analysis and synthesis portions and may include coding and decoding operations as described herein. Also, the coefficients output from low pass filter 401 may be fed back into filters 401 and 402 iteratively to create a number of decomposition levels.

Scaling units 408 and 409 apply a scale dependent parameter to the even and odd coefficients as described above to multiple decomposition levels. The outputs of scaling units 408 and 409 and the even and odd coefficients from filter 401 are upsampled by upsampling units 410–413. The outputs of upsampling units 410 and 411 are coupled to inputs of low pass inverse transform filters 414 and 415 respectively, and the outputs of upsampling units 412 and 413 are coupled to inputs of high pass inverse transform filters 416 and 417 respectively. The outputs of inverse filters 414–417 are coupled to divider units 418–421, which divide the outputs by 2 to results in averaging two numbers to compensate for the use of an overcomplete DWT. The renormalization proceeds along the same lines as for a DWT, just the value gamma for the wavelet system is, roughly speaking, doubled (see table).

Addition unit 422 adds the outputs of decoder units 418 and 419, while addition unit 423 adds the outputs of divider units 420 and 421. Addition unit 424 adds the outputs of addition units 422 and 423 to create the $X^1$ signal. Addition units 422–424 may operate in a well-known manner, such as, for example, described above.

If the filters H and G are orthogonal the filters $H^*H$ and $G^*G$ in the first stage of the filter bank are simply the autocorrelation filters of H and G.

For scales j>1 the perfect reconstruction property is expressed using not the original filters $H, H^*, G, G^*$, but iterated versions of those, denoted by $H_J, H^*_J, G_J, G^*_J$, as follows:

$$s^{J-1}(z) = \tfrac{1}{2}(H^*_J H_J [s^{J-1}](z) + G^*_J G_J [s^{J-1}](z)).$$

In analogy with the critically sampled case, a sharpened image $x_{rdwt-s}$ can be defined as $$x_{rdwt-s} := \tfrac{1}{2}(H^* H [x] + \mu G^* G [x]). \quad (14)$$

By choosing $\mu^J=2^{j\alpha}$ sharpened ($\alpha<0$) late scaling coefficients may be obtained by $$S^1_{rdwt-s}=\frac{1}{2}(H^* H [S^1]+\mu_1 G^* G [S^1]). \quad (15)$$

at scale $j=1$. For scales $j>1$ the sharpened scaling coefficients are defined as $$S^J_{rdwt-s}=1/(2^{J+1}) (H^*_j H_j [S^j]+\mu_j G^*_j G_j [S^J]). \quad (16)$$

The filter bank implementation for overcomplete multiscale sharpening is shown in FIG. 4. Compared to the maximal decimated filter bank structure in FIG. 3, the down-sampling by a factor of two is neglected. But in the same way as in FIG. 3, the detail coefficients are multiplied by $\mu_J$. In contrast to the critically sampled DWT, the range of possible exponents is extended.

The normalization of modified wavelet coefficients may be performed in the same way as for the critically sampled DWT. The renormalization proceeds along the same lines as for a DWT, except that the value σ for the wavelet system is, roughly speaking, doubled. For overcomplete transforms, the values change as shown in Table 2 below:

TABLE 2

| Daubechies wavelet system of order N | Hoelder regularity of overcomplete system | Vanishing moments of overcomplete systems | γ = min (Hoelder, vanishing moments) |
|---|---|---|---|
| 1 | ≧1 | 2 | 1 |
| 2 | ≧1.0 | 4 | 1.0 |
| 3 | ≧1.830 | 6 | 1.830 |
| 4 | ≧3.192 | 8 | 3.192 |
| 5 | ≧3.776 | 10 | 3.776 |
| 6 | ≧4.316 | 12 | 4.316 |

Similarly to multiscale sharpening for critically sampled and overcomplete wavelet transforms, multiscale smoothing is possible for critically sampled and overcomplete wavelet transforms by choosing the parameter α to be greater than zero.

There are some advantages of knowing the smoothness of the original data and the processed input data. Assume the input data is a smoothing of the original data by rescaling wavelet coefficients obtained from applying an orthogonal DWT, then the technique described herein can reconstruct the original data exactly. For example, it means that a smoothed step edge in the processed input data can be reversed to the original step edge.

Multiscale smoothing and sharpening using a DWT with orthogonal wavelets is invertible, while, in contrast, the RDWT is not invertible. The reason for this is that the RDWT is not an orthogonal transform and, in general, $$\frac{1}{2}H (H^* H[x]+\mu G^* G[x])+\frac{1}{2}G (H^* H[x]+\mu G^* G[x]) \neq H[x]+\mu G[x]. \quad (17)$$

Figure 5:
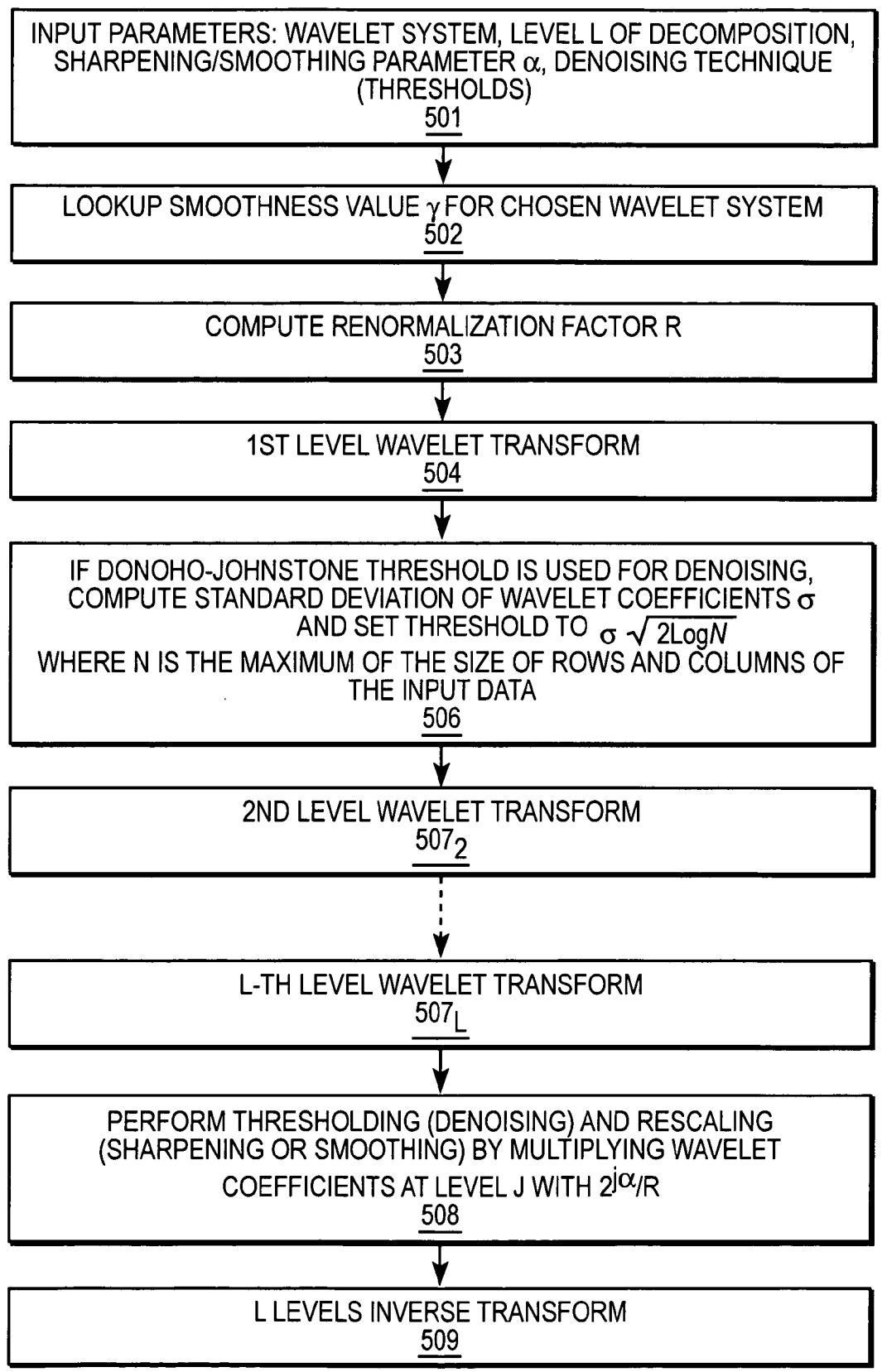
FIG. 5 illustrates a flow chart of one embodiment of the process for performing multi-scale sharpening and smoothing with wavelets.

FIG. 5 illustrates a flow chart of one embodiment of the process for performing multi-scale sharpening and smoothing with wavelets. Referring to FIG. 5, the process begins with processing logic receiving input parameters (processing block 501). In one embodiment, the input parameters comprise the type of wavelet system, the number of decomposition levels, the sharpening/smoothing parameter, and the denoising technique. With respect to the denoising technique, the input parameters comprise thresholds for the denoising technique.

Once the input parameters have been received, processing logic looks up the smoothness value λ for the chosen wavelet system (processing block 502) and computes the renormalization factor R using the formula given above (processing block 503). The valves of λ may be stored in a look up table, with each entry being associated with a different wavelet system. The processing blocks 501–503 represent an initialization portion of the process. These steps are performed once, with the remaining steps being performed for every image.

After initialization, processing logic performs a first level wavelet transform (processing block 504). Processing logic then sets the threshold for denoising (processing block 506). In one embodiment, if the Donoho-Johnstone threshold is used for denoising, processing logic computes the standard deviation of wavelet coefficients and sets the threshold to:

$$\sigma\sqrt{2 \log N}$$

where N is the maximum of the rows and columns of the data and σ is the standard deviation of the first level of wavelet coefficients.

Next, processing logic performs the second level wavelet transform on the coefficients (processing block $507_2$). Processing logic performs other wavelet transforms up to the L-th level of the wavelet transform (processing block $507_L$).

After performing the wavelet transforms, processing logic performs thresholding (denoising) and rescaling (sharpening or smoothing) by multiplying wavelet coefficients at level j with:

$$2^{j\alpha}$$

(processing block 508). Thereafter, processing logic performs L levels of the inverse transform (processing block 509).

Figure 6A:
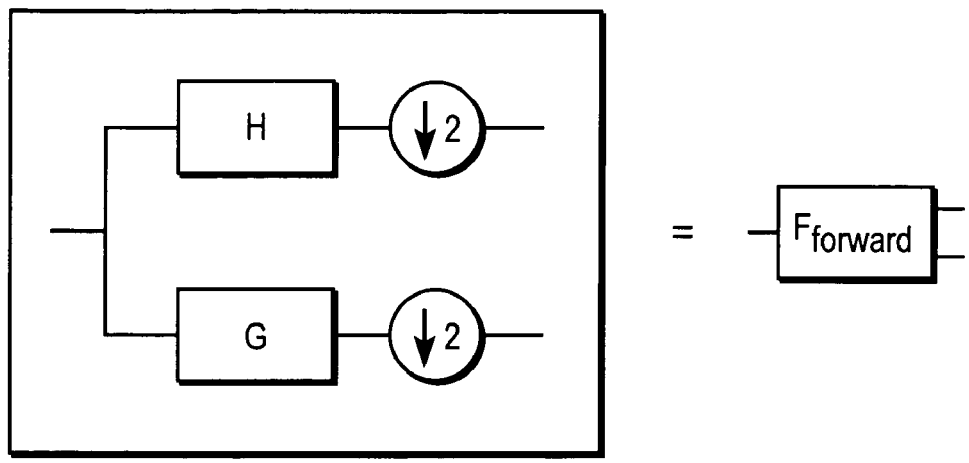
FIGS. 6A–D illustrate forward and reverse transforms.
Figure 6B:
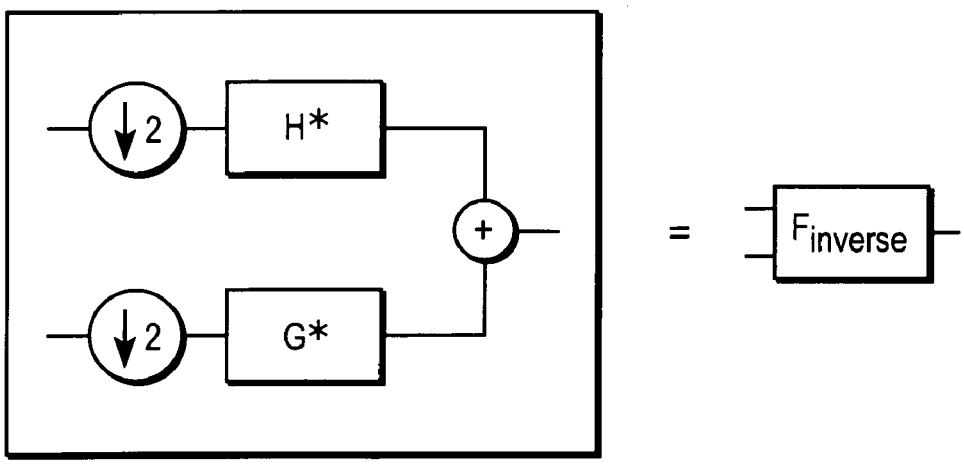
Figure 6C:
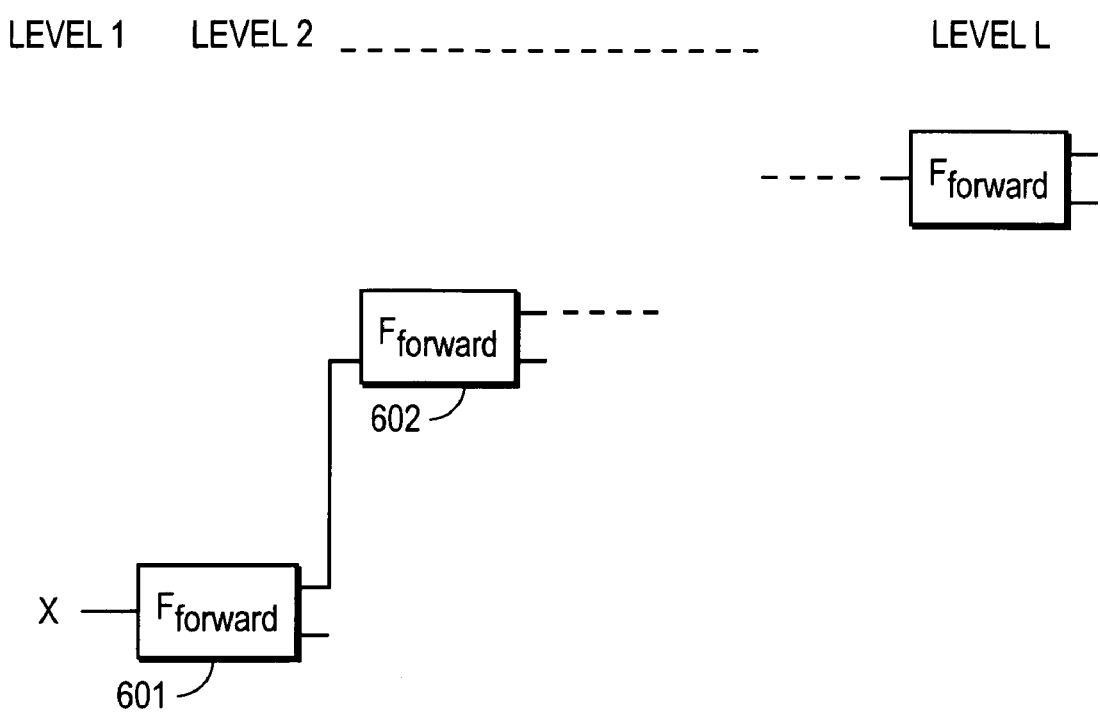
Figure 6D:
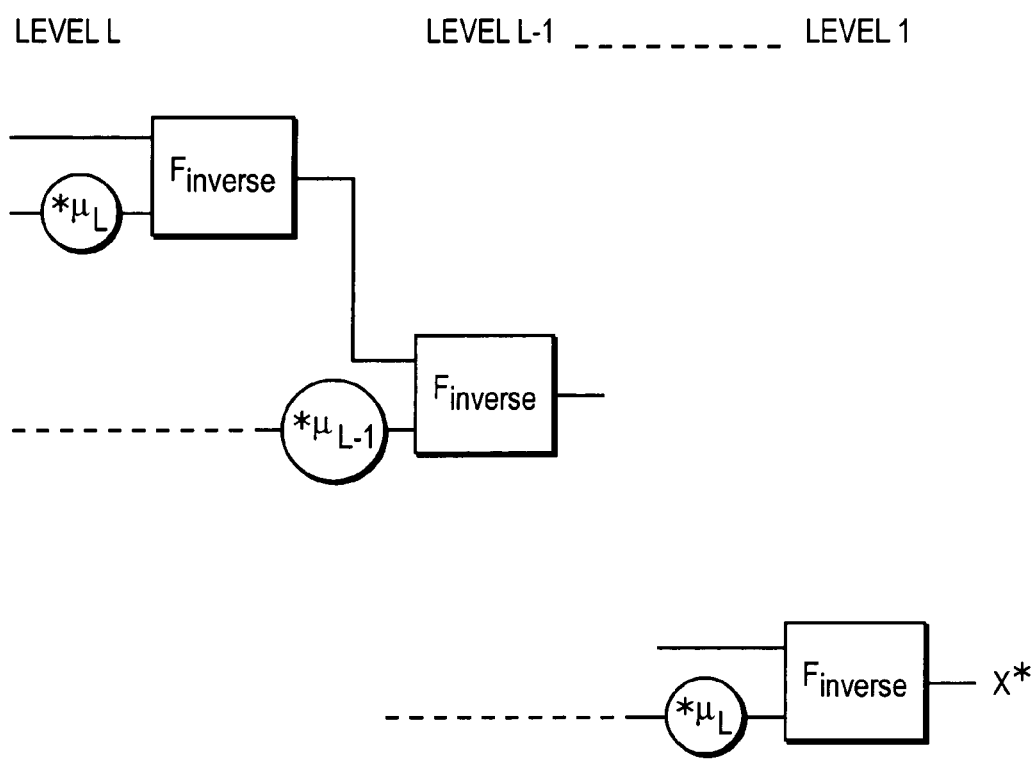

FIGS. 6A–D illustrate forward and inverse transform. FIG. 6A and B illustrate building blocks for the forward and inverse discrete wavelet transform (DWT) respectively. Note that these are similar to the similarly named blocks in FIG. 3. FIG. 6C is one embodiment of a forward DWT for L levels of decomposition. Referring to FIG. 6C, the input X is input into the level one forward DWT block 601. The output of the level one forward DWT 601 is input to the level two forward DWT block 602 and continues through the remaining levels of decomposition to level L in similar fashion. FIG. 6D illustrates the inverse DWT with resealing (sharpening/smoothing) L levels of decomposition. Referring to FIG. 6D, noted that there is a sharpening/smoothing parameter for each level of the inverse DWTs. That is, the sharpening/smoothing parameter is the same for all transform steps being performed on the same level.

Figure 7A:
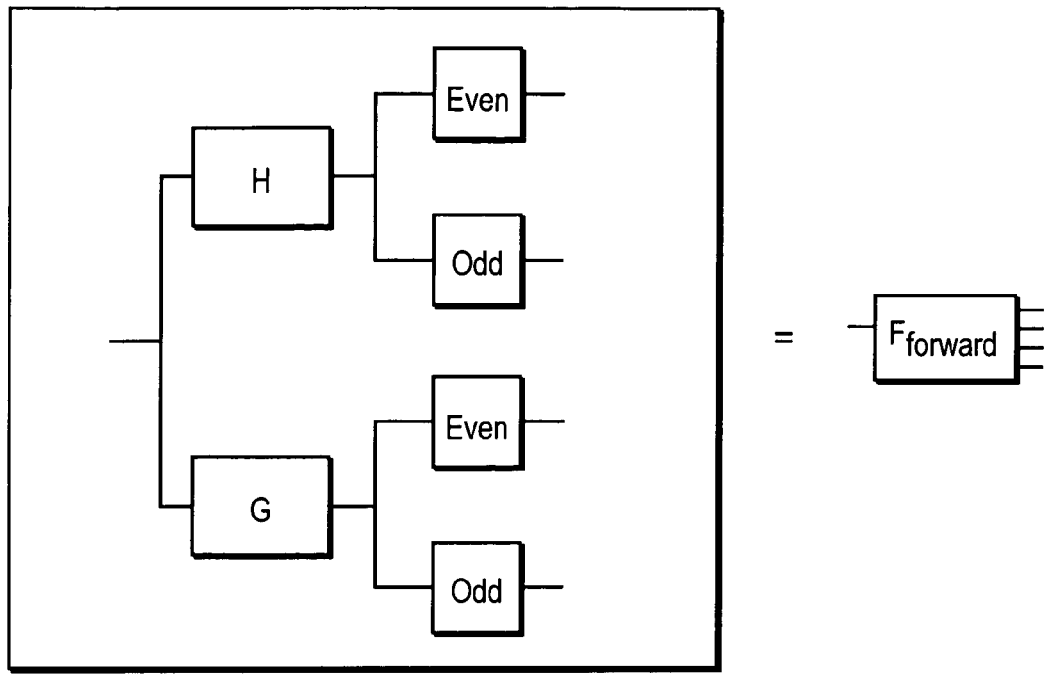
FIGS. 7A–D illustrate the application of sharpening/smoothing to RDWTs.
Figure 7B:
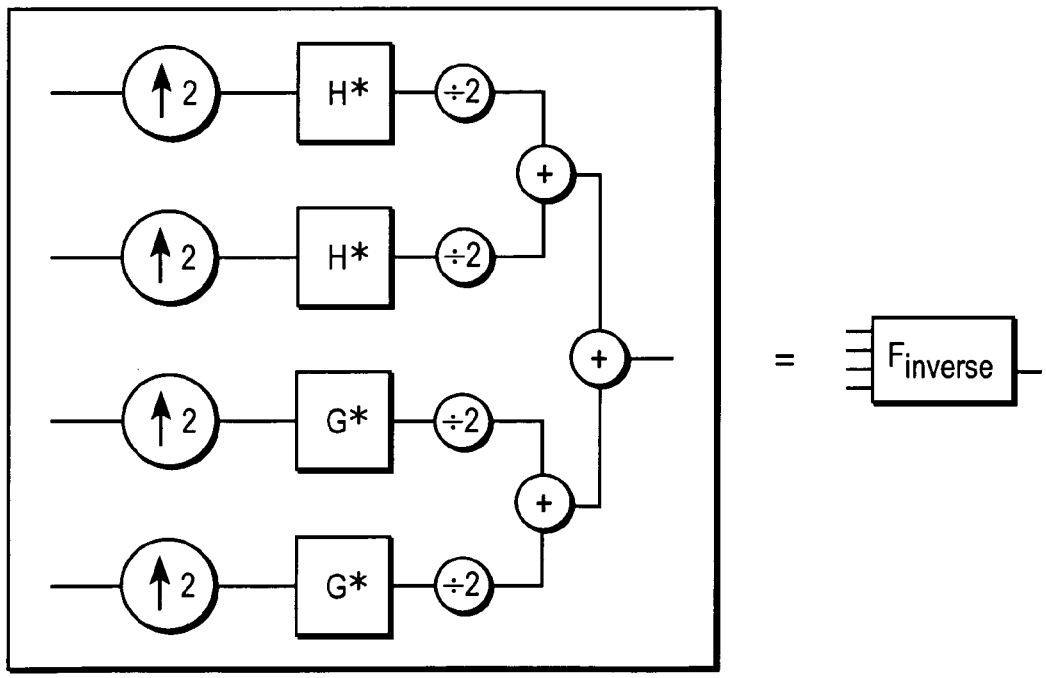
Figure 7C:
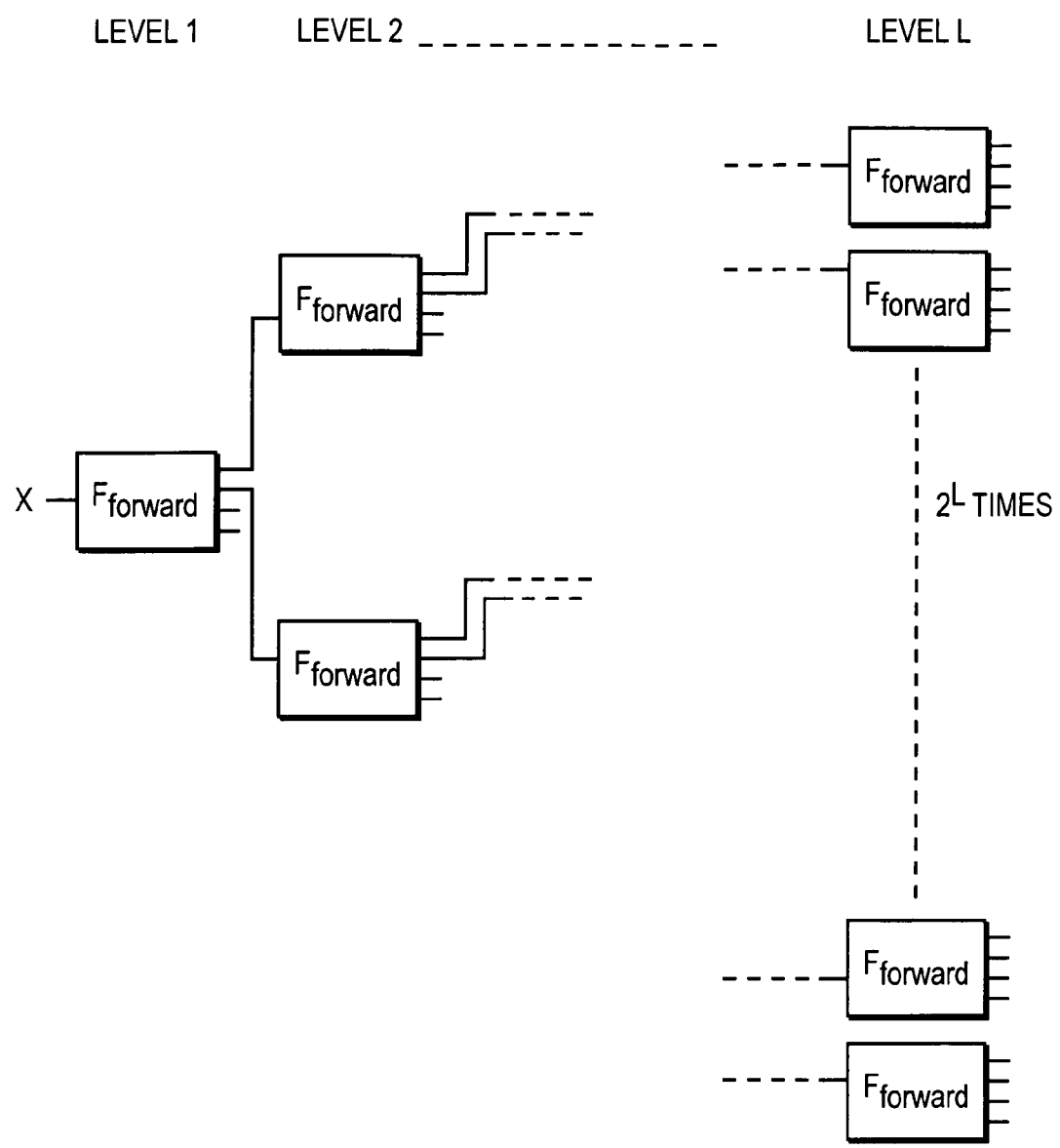
Figure 7D:
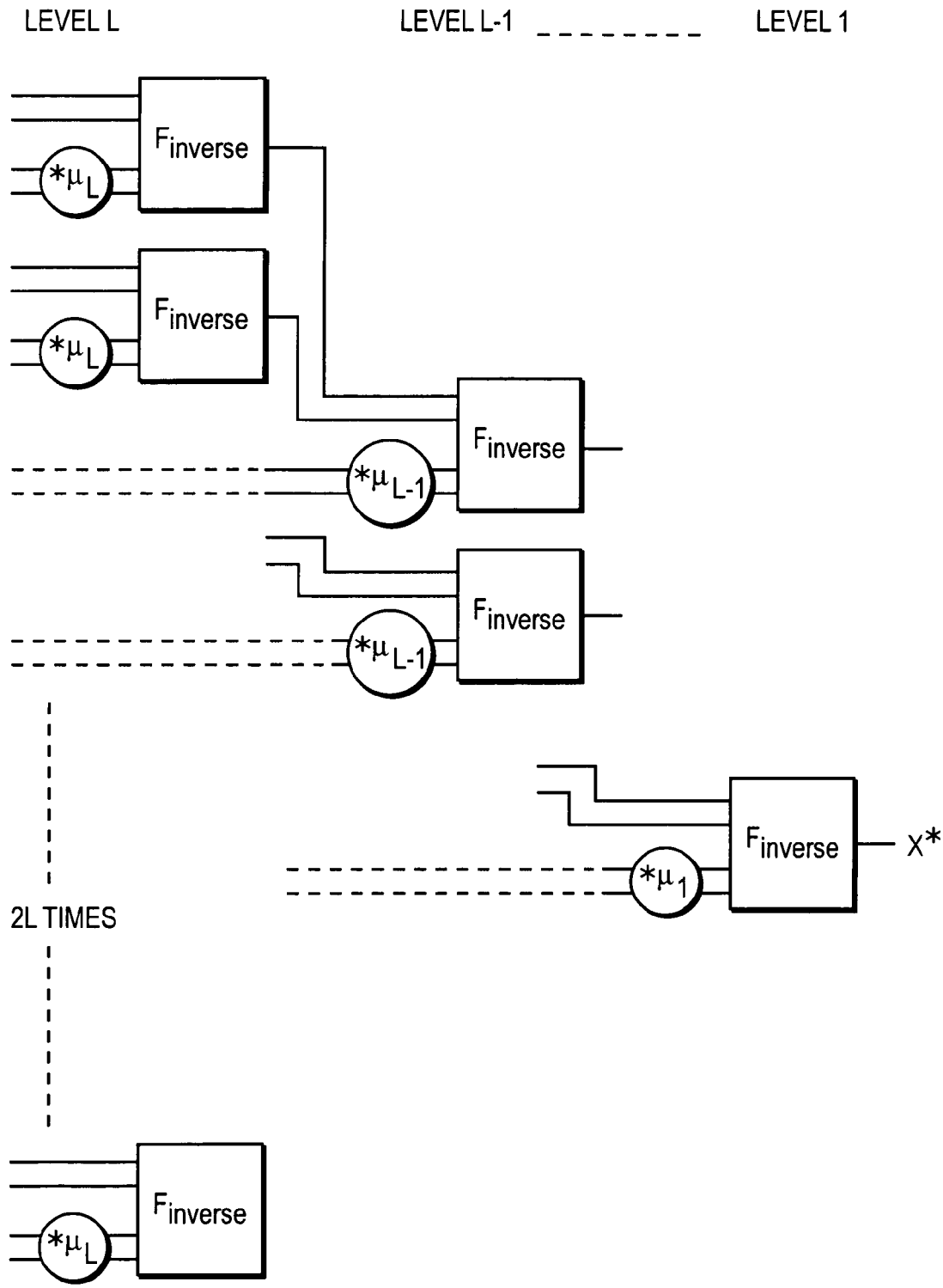

FIGS. 7A–D illustrate the application of sharpening/smoothing to RDWTs. FIGS. 7A–7B illustrate the building block for forward and inverse redundant DWT (RDWT), respectively. FIG. 7C illustrates a forward RDWT for L levels of decomposition. FIG. 7D illustrates the inverse RDWT for all levels of decomposition with rescaling (sharpening/smoothing) for L levels of decomposition. Referring to FIG. 7D, the rescaling parameter is the same for each of the individual processing blocks in each level. However, the rescaling parameter may be different from level to level.

Selecting the Sharpening/Smoothing Parameter

Depending on knowledge about the smoothness of the input data and output data, there are different possibilities to determine the parameter α. Four different techniques are described below; however, other techniques may be used. First, if the available input data are data obtained from sending original data through an input device, such as a scanner, the Hoelder regularity of the data is that of the input device. In case of the scanner, the regularity is given by the smoothness of the pointspread function. If the original data have smoothness β and the scanned input data have smoothness ε, then a reasonable choice for the sharpening parameter would be −(ε−β). However, the term |ε−β| is not allowed to be larger than λ, the Hoelder regularity of the wavelet system. Therefore, the sharpening parameter should be α=0 if β>λ and ε>λ, and α=min (λ,ε)−β if β≦λ.

If the knowledge of the smoothness of the input data does not exist, the corresponding Hoelder regularity ε can be estimated from the decay of wavelet coefficients across scale. The Hoelder regularity ε should be the smallest number such that $$|d_{j,k}| \leq C2^{j(\varepsilon+\frac{1}{2})}$$

for a constant C>0 and scales j and positions k. If the original data contain step edges as occurs, in the text regions, for example the original smoothness β is equal to zero.

Given the smoothness β of the original data the sharpening/smoothing parameter α should be always chosen such that that 0≦β+α≦λ.

When processing a scanned image, the exponent α=−1 may be used, which has a theoretical reason. An image can be modeled as a function that consists of smooth regions and step edges. By scanning this image, the step edges get blurred. This blurring can be modeled as a convolution with a Gaussian kernel or a kernel of similar characteristic. As a consequence, the overcomplete wavelet decomposition with the Haar system will capture a decay of wavelet coefficients described by the exponent 1. In order to sharpen the scanned image, i.e. to reverse smoothing of the edges, the exponent α=−1 is chosen as an exponent in the sharpening parameter. The parameter λ in the normalization constant in Eq.(10) above is λ=1. In this case for a total decomposition level L=3, the following modifications of the wavelet coefficients have to be made:

multiplication of the first level of wavelet coefficients by $$(2^{-1})/\sqrt{9/(2^8-4)} = 2.6458$$

multiplication of the second level of wavelet coefficients by $$(2^{-2})/\sqrt{9/(2^8-4)} = 1.3229$$

multiplication of the third level of wavelet coefficients by $$(2^{-3})/\sqrt{9/(2^8-4)} = 0.6614$$

Thus, a general scheme has been described of how to choose the sharpening parameter in applications that involve scanned documents, e.g., in a digital copier, a digital camera, facsimile machine, printer, etc.

Another application of the multiscale sharpening and smoothing is to perform an adaptive smoothing or sharpening depending on the wavelet coefficients. Therefore, that only selected coefficients get sharpened by multiplication with $2^{j\alpha}$ with α<0 and coefficients in smooth areas get smoothed by multiplication by $2^{j\beta}$ with β>0 with a overcomplete Haar system.

Figure 8:
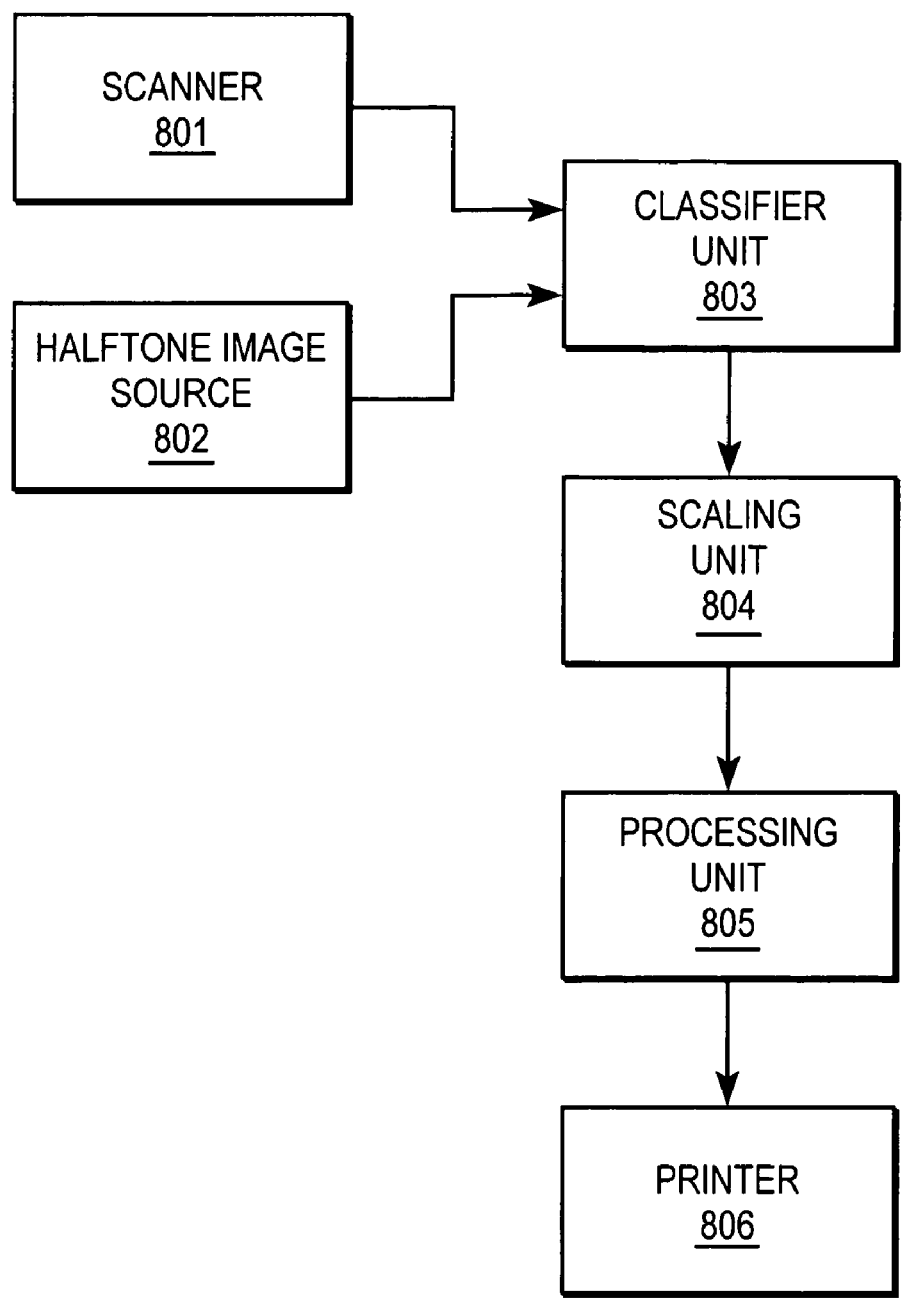
FIG. 8 is a block diagram of one embodiment of a copier.

One embodiment of a digital copier is shown in FIG. 8. Referring to FIG. 8, a scanner 801 or other halftone image source 802 supplies an image to classifier unit 803, which classifies the image data as text and background. The output of classifier unit 803 is received by scaling unit 804 which performs smoothing or sharpening depending on the classified pixel. Note that the use of classification and basing the sharpening/smoothing on the classification is optional. The output of scaling unit 804 is coupled to processing unit 805 which performs other processes (e.g., downsampling, gamma correction, halftone, etc.). The output of processing unit 805 is received by printer 806, which prints the image.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a method and apparatus for performing data processing has been described.

I claim:

1. A method for processing input data comprising:
   decomposing the input data into a plurality of decomposition levels by applying a wavelet transform to the input data; and
   modifying coefficients in at least two of the plurality of decomposition levels by scaling coefficients in the at least two decomposition levels using different scale dependent parameters for each of the decomposition levels, wherein each of the different scale dependent parameters is determined according to the following formula:

$$\mu_j = 2^{j\alpha}$$

where the value of α indicates whether sharpening or smoothing is applied to coefficients and j indicates the scale.

2. The method defined in claim 1 wherein the input data comprises image data.

3. The method defined in claim 1 wherein only wavelet coefficients are scaled.

4. The method defined in claim 1 wherein modifying coefficients comprises multiplying each coefficient in one of the decomposition levels by a first scale dependent parameter and multiplying each coefficient in another of the decomposition levels by a second scale dependent parameter.

5. The method defined in claim 1 wherein sharpening is applied to coefficients if α is less than zero and smoothing is applied to coefficients if α is greater than zero.

6. The method defined in claim 1 wherein modifying coefficients results in smoothing of coefficients for scale dependent parameters greater than a transition value and results in sharpening of coefficients for scale dependent parameters less than the transition value.

7. The method defined in claim 6 wherein the transition value is 1.

8. The method defined in claim 1 wherein the transform comprises a critically sampled discrete wavelet transform.

9. The method defined in claim 1 wherein the transform comprises an overcomplete discrete wavelet transform.

10. The method defined in claim 1 wherein the transform comprises a complex wavelet transform.

11. The method defined in claim 1 wherein the transform comprises a critically sampled wavelet packet transform.

12. The method defined in claim 1 the transform comprises an overcomplete wavelet packet transform.

13. The method defined in claim 1 wherein decomposing the image data comprises applying a transform to the input data wherein the transform comprises an overcomplete transform for selected subbands.

14. The method defined in claim 1 comprising selecting the scale dependent parameter based on knowledge of the input data and knowledge of the image source.

15. The method defined in claim 14 wherein the knowledge of the image source comprises a model point spread function of the image source.

16. The method defined in claim 14 wherein the knowledge of the data comprises an indication the data contains step edges.

17. The method defined in claim 14 wherein selecting the scale dependent parameter is based on an estimate of decay of wavelet coefficients across scales.

18. The method defined in claim 1 further comprising performing an inverse transform on coefficients after scaling has been performed.

19. The method defined in claim 1 further comprising denoising after applying the wavelet transform.

20. The method defined in claim 19 further comprising performing denoising as part of scaling coefficients by multiplying all coefficients in one of the decomposition levels above a predetermined threshold and setting other coefficients to a value near zero.

21. The method defined in claim 20 wherein the value is zero.

22. The method defined in claim 19 further comprises coloring noise that remains after scaling coefficients.

23. The method defined in claim 1 further comprising performing denoising as part of scaling coefficients by reducing all coefficients by a predetermined amount to a value near zero and then multiplying all coefficients in one of the decomposition levels above a predetermined threshold and reducing all coefficients by a predetermined amount to a value near zero.

24. The method defined in claim 23 wherein the value is zero.

25. The method defined in claim 1 wherein the different scale dependent parameters are based on desired smoothness and sharpness.

26. The method defined in claim 1 further comprising renormalizing coefficients.

27. The method defined in claim 26 wherein renormalizing coefficients comprises applying a scalar to coefficients in at least one decomposition level.

28. The method defined in claim 26 wherein renormalizing coefficients is performed as part of scaling coefficients by multiplying all coefficients in one of the decomposition levels by a scale dependent parameter chosen to achieve renormalization.

29. The method defined in claim 26 wherein renormalizing coefficients is performed as part of scaling coefficients by computing a range of wavelet coefficients before rescaling, performing rescaling, and then scaling modified coefficients back to the range before rescaling.

30. The method defined in claim 1 wherein the scale dependent parameters comprise monotonic functions.

31. The method defined in claim 1 further comprising classifying wavelet coefficients into types.

32. The method defined in claim 31 wherein the types comprise text and background.

33. A method for processing input data that comprises image data, the method comprising:
    decomposing the input data into a plurality of decomposition levels by applying a wavelet transform to the input data;
    performing denoising on coefficients in at least one of the plurality of decomposition levels;
    modifying coefficients in at least two of the plurality of decomposition levels by scaling coefficients in at least two decomposition levels using different scale dependent parameters for each of the decomposition levels;
    performing renormalization on coefficients; and
    inverse transforming the coefficients, wherein each of the different scale dependent parameters is determined according to the following formula:

$$\mu_j = 2^{j\alpha}$$

where the value of $\alpha$ indicates whether sharpening or smoothing is applied to coefficients and j indicates the particular scale.

34. The method defined in claim 33 wherein the input data comprises image data.

35. The method defined in claim 33 wherein modifying coefficients comprises multiplying each coefficient in one of the decomposition levels by a first scale dependent parameter and multiplying each coefficient in another of the decomposition levels by a second scale dependent parameter.

36. The method defined in claim 33 wherein sharpening is applied to coefficients if $\alpha$ is less than zero and smoothing is applied to coefficients if $\alpha$ is greater than zero.

37. The method defined in claim 33 wherein modifying coefficients results in smoothing of coefficients for scale dependent parameters greater than a transition value and results in sharpening of coefficients for scale dependent parameters less than the transition value.

38. The method defined in claim 37 wherein the transition value is 1.

39. The method defined in claim 33 further comprising performing simultaneously denoising and sharpening by multiplying all coefficients in one of the decomposition levels above a predetermined threshold and setting other coefficients to a value near zero.

40. The method defined in claim 39 wherein the value is zero.

41. The method defined in claim 33 further comprising performing denoising as part of scaling coefficients by reducing all coefficients by a predetermined amount to a value near zero and then multiplying all coefficients in one of the decomposition levels above a predetermined threshold and reducing all coefficients by a predetermined amount to a value near zero.

42. The method defined in claim 41 wherein the value is zero.

43. The method defined in claim 33 further comprising coloring noise that remains after scaling coefficients.

44. The method defined in claim 33 further company renormalizing coefficients by applying a scalar to coefficients in at least one decomposition level.

45. The method defined in claim 44 wherein renormalizing coefficients is performed as part of scaling coefficients by multiplying coefficients in one of the decomposition levels by a scale dependent parameter chosen to achieve renormalization.

46. An apparatus for processing input data comprising:
means for decomposing the input data into a plurality of decomposition levels by applying a wavelet transform to the input data; and
means for modifying coefficients in at least two of the plurality of decomposition levels by scaling coefficients in the at least two decomposition levels using different scale dependent parameters for each of the decomposition levels, wherein each of the different scale dependent parameters is determined according to the following formula:

$$\mu_j = 2^{j\alpha}$$

where the value of $\alpha$ indicates whether sharpening or smoothing is applied to coefficients, and j indicates a particular scale.

47. The apparatus defined in claim 46 wherein the input data comprises image data.

48. The apparatus defined in claim 46 wherein the means for modifying coefficients comprises means for multiplying each coefficient in one of the decomposition levels by a first scale dependent parameter and means for multiplying each coefficient in another of the decomposition levels by a second scale dependent parameter.

49. The apparatus defined in claim 46 wherein means for modifying applies sharpening to coefficients if $\alpha$ is less than zero and applies smoothing to coefficients if $\alpha$ is greater than zero.

50. The apparatus defined in claim 46 wherein modifying coefficients results in smoothing of coefficients for scale dependent parameters greater than a transition value and results in sharpening of coefficients for scale dependent parameters less than the transition value.

51. The apparatus defined in claim 50 wherein the transition value is 1.

52. The apparatus defined in claim 46 further comprising means for performing an inverse transform on coefficients after scaling has been performed.

53. The apparatus defined in claim 46 further comprising means for denoising after applying the wavelet transform.

54. The apparatus defined in claim 46 further comprising means for performing denoising as part of scaling coefficients by multiplying all coefficients in one of the decomposition levels above a predetermined threshold and setting other coefficients to a value near zero.

55. The apparatus defined in claim 54 wherein the value is zero.

56. The apparatus defined in claim 46 further comprising performing denoising as part of scaling coefficients by reducing all coefficients by a predetermined amount to a value near zero and then multiplying all coefficients in one of the decomposition levels above a predetermined threshold and reducing all coefficients by a predetermined amount to a value near zero.

57. The apparatus defined in claim 54 wherein the value is zero.

58. The apparatus defined in claim 46 further comprising means for renormalizing coefficients.

59. The apparatus defined in claim 58 wherein the means for renormalizing coefficients comprises means for applying a scalar to coefficients in at least one decomposition level.

60. The apparatus defined in claim 58 wherein the means for renormalizing coefficients operates as part of scaling coefficients by multiplying all coefficients in one of the decomposition levels by a scale dependent parameter chosen to achieve renormalization.

61. An article of manufacture having one or more recordable media storing executable instructions thereon which, when executed by one or more processing devices, cause the one or more processing devices to:
decompose input data into a plurality of decomposition levels by applying a wavelet transform to the input data; and
modify coefficients in at least two of the plurality of decomposition levels by scaling coefficients in the at least two decomposition levels using different scale dependent parameters for each of the decomposition levels, wherein each of the different scale dependent parameters is determined according to the following formula:

$$\mu_j = 2^{j\alpha}$$

where the value of $\alpha$ indicates whether sharpening or smoothing is applied to coefficients and j indicates a particular scale.

62. The article of manufacture defined in claim 61 further comprising instructions which, when executed by the one or more processing devices, cause the one or more processing devices to multiply each coefficient in one of the decomposition levels by a first scale dependent parameter and multiplying each coefficient in another of the decomposition levels by a second scale dependent parameter 63. The article of manufacture defined in claim 61 wherein sharpening is applied to coefficients if $\alpha$ is less than zero and smoothing is applied to coefficients if $\alpha$ is greater than zero.

64. The article of manufacture defined in claim 61 wherein modifying coefficients results in smoothing of coefficients for scale dependent parameters greater than a transition value and results in sharpening of coefficients for scale dependent parameters less than the transition value.

65. The article of manufacture defined in claim 64 wherein the transition value is 1.

66. An apparatus for processing input data comprising:
a forward wavelet filter to convert the input data into coefficients in a plurality of decomposition levels;
a scaling unit to modifying coefficients in at least two of the plurality of decomposition levels by scaling coefficients in the at least two decomposition levels using different scale dependent parameters for each of the decomposition levels; and
an inverse wavelet filter coupled to the scaling unit, wherein each of the different scale dependent parameters is determined according to the following formula:

$$\mu_j = 2^{j\alpha}$$

where the value of $\alpha$ indicates whether sharpening or smoothing is applied to coefficients and j indicates a particular scale.

67. The apparatus defined in claim 66 wherein the input data comprises image data.

68. The apparatus defined in claim 66 wherein the scaling unit multiplies each coefficient in one of the decomposition levels by a first scale dependent parameter and multiplies each coefficient in another of the decomposition levels by a second scale dependent parameter 69. The apparatus defined in claim 66 wherein the scaling unit applies sharpening to coefficients if α is less than zero and applies smoothing to coefficients if α is greater than zero.

70. The apparatus defined in claim 66 wherein modifying coefficients results in smoothing of coefficients for scale dependent parameters greater than a transition value and results in sharpening of coefficients for scale dependent parameters less than the threshold value.

71. The apparatus defined in claim 70 wherein the transition value is 1.

72. A copier comprising:
an image source;
a classifier unit coupled to the image source;
a scaling unit coupled to the classifier unit comprising
    a forward wavelet filter to convert the image data into coefficients in a plurality of decomposition levels,
    a scaling unit to modifying coefficients in at least two of the plurality of decomposition levels by scaling coefficients in the at least two decomposition levels using different scale dependent parameters for each of the decomposition levels,
an inverse wavelet filter coupled to the scaling unit; and
a printer coupled to the scaling unit, wherein each of the different scale dependent parameters is determined according to the following formula:

$$\mu_j = 2^{j\alpha}$$

where the value of α indicates whether sharpening or smoothing is applied to coefficients and j indicates a particular scale.

73. The copier defined in claim 72 wherein the scaling unit multiplies each coefficient in one of the decomposition levels by a first scale dependent parameter and multiplies each coefficient in another of the decomposition levels by a second scale dependent parameter 74. The copier defined in claim 72 wherein the scaling unit applies sharpening to coefficients if α is less than zero and applies smoothing to coefficients if α is greater than zero.

75. The copier defined in claim 72 wherein modifying coefficients results in smoothing if one of the scale dependent parameters is greater than a transition value and results in sharpening if one of the scale dependent parameters is less than the threshold value.

76. The copier defined in claim 75 wherein the transition value is 1.

* * * * *